US008639654B2

(12) United States Patent
Vervaet et al.

(10) Patent No.: US 8,639,654 B2
(45) Date of Patent: Jan. 28, 2014

(54) METHOD FOR UPDATING DIGITAL MAPS

(75) Inventors: Gert Vervaet, Ghent (BE); Tim Bekaert, Heule (BE); Pascal Clarysse, Koksijde (BE)

(73) Assignee: TomTom Global Content B.V., Eindhoven (NL)

( * ) Notice: Subject to any disclaimer, the term of this patent is extended or adjusted under 35 U.S.C. 154(b) by 58 days.

(21) Appl. No.: 13/256,688

(22) PCT Filed: Dec. 31, 2009

(86) PCT No.: PCT/EP2009/068048
§ 371 (c)(1),
(2), (4) Date: Sep. 15, 2011

(87) PCT Pub. No.: WO2010/105713
PCT Pub. Date: Sep. 23, 2010

(65) Prior Publication Data
US 2012/0197839 A1  Aug. 2, 2012

Related U.S. Application Data

(60) Provisional application No. 61/202,585, filed on Mar. 16, 2009.

(51) Int. Cl.
G06F 7/00 (2006.01)
G06F 17/00 (2006.01)
(52) U.S. Cl.
USPC .......................................... 707/602; 707/603
(58) Field of Classification Search
None
See application file for complete search history.

(56) References Cited

U.S. PATENT DOCUMENTS

| | | | |
|---|---|---|---|
| 2003/0069694 A1 | 4/2003 | Fuchs et al. | |
| 2009/0138497 A1* | 5/2009 | Zavoli et al. | 707/102 |
| 2012/0096358 A1* | 4/2012 | Barnes, Jr. | 715/728 |

FOREIGN PATENT DOCUMENTS

| | | |
|---|---|---|
| EP | 1 726 971 | 11/2006 |
| JP | 2008 292454 A | 12/2008 |
| WO | 99/57575 A2 | 11/1999 |

OTHER PUBLICATIONS

International Search Report issued May 7, 2010 for International Application No. PCT/EP2009/068048.
XP010843059—Bruntrup R et al: "Incremental map generation with GPS traces" Intelligent Transportation Systems, 2005. Proceedings. 2005 IEEE Vienna, Austria Sep. 13-16, 2005, Piscataway, NJ, USA,IEEE LNKD-DOI: 10. 1109/ITSC.2005. 1520084, Sep. 13, 2005.

* cited by examiner

Primary Examiner — Uyen Le

(57) ABSTRACT

A method for updating speed limit, service stop location, or other attributes for road segments in a digital map (18) by extrapolating probe data from a subset of probe data which has been profiled to have originated from trustworthy probe traces. Probe measurements from a plurality of probes is collected and profiled against known information. From this, a subset of trustworthy probes is identified, comprising those probe traces which observe the known attribute of interest within an acceptable range for a majority of the driving time. These trustworthy probe traces are tracked during travel on other road segments whose attribute data is unknown or unreliable. A specification for the unknown or unreliable attribute on the other road segments can be extrapolated based on the collected information from all of the trustworthy probe traces as they travel that road segment. The digital map (18) can then be updated by setting attribute information in relation to the extrapolated behavior data. If atypical behavior is noticed in areas where there is high confidence of the particular attribute, then all probe measurements may be categorically rejected as unreliable.

16 Claims, 10 Drawing Sheets

METHOD FOR UPDATING DIGITAL MAPS

CROSS REFERENCE TO RELATED APPLICATIONS

This application is the National Stage of International Application No. PCT/EP2009/068048, filed Dec. 31, 2009 and designating the United States. The entire contents of this application are incorporated herein by reference.

This application claims the benefit of priority from U.S. Provisional Application No. 61/202,585 filed on Mar. 16, 2009. The entire contents of this application are incorporated herein by reference.

BACKGROUND OF THE INVENTION

1. Field of the Invention

This invention relates to digital maps of the type for displaying road or pathway information, and more specifically toward a method for updating information contained in a digital map using reliable probe data.

2. Related Art

In nearly all developed and developing countries, roadways are becoming more congested and as a result travel times are increasing. The need for accurate and timely traffic information continues to grow. Such need has encouraged the rise of personal navigation devices which utilize digital maps combined with accurate positioning data. Commuters seeking navigation assistance have embraced this emerging technology, trying to avoid traffic jams and for businesses trying to minimize transportation costs. The effectiveness of such navigation systems is inherently dependent upon the accuracy and completeness of its digital map data and other provided information.

In the current field of personal navigation systems these Personal Navigation Systems (PNAV), like dedicated handheld navigation systems, Personal Digital Assistance (PDAs), mobile telephones provided with a navigation module, as well as the in-car navigation market, end-user needs are already commonly addressed by many applications. Vendors differentiate by adding additional functions and features to their PNAV. Examples include speed camera information, traffic information, junction views, and the like. Such additional features of PNAV assist the user in taking the correct decisions when traveling from a starting location to a destination. One approach is illustrated by way of example in FIG. 1 which presents one possible display screen of a PNAV device. A bird's eye map may be shown on one portion of the screen together with a junction view, i.e., a depiction of all lanes and side posts as are present in reality superimposed with additional information such as arrows, route indications and the like.

Sometimes, a driver or navigator will make decisions as to which particular route to follow based on a comparison of the estimated travel time and/or ease between two or more alternative routes. For example, FIG. 2 illustrates an exemplary digital map having a starting point 12 and a destination point 14. Two alternative routes are depicted, one representing a slightly shorter travel distance but longer travel time which is not preferred. Rather, the preferred route occupies a shorter projected travel time even though its total travel distance is slightly longer.

Navigation decisions of this nature are highly dependent upon the allowable speed limits for the various road segments connecting the starting and destination points. For example, referring again to FIG. 1, the bird's eye digital map view shown on the left hand side of the display screen includes speed limit indications 16 along several of the depicted road segments. Thus, a navigator's decision which course to follow may be decided as a function of the indicated speed limits 16. Furthermore, a driver's ability to comply with posted speed limits is sometimes dependent upon knowing what the speed limits are on the particular road segment being traveled. Sometimes, a roadside sign indicating the local speed limit may not be visible. If the particular road segment is unfamiliar to the driver, the speed limit may not be readily apparent. By reference to the information provided on a PNAV, like that illustrated in FIG. 1, the user's current position is matched to a particular road segment contained in the digital map, and the speed limit indication for that road as stored in the memory device of the PNAV may be displayed for the safe driving benefit of the driver.

Road speeds for passenger vehicles are only one attribute which is useful to know and have provided in a PNAV device. For another example, one may consider heavy truck/lorry maximum speeds which could be different than passenger vehicle limits. Another example of useful attribute could be the location of service vehicle stops such as taxis, buses, and the like. Of course, many other road attributes could also be identified in these contexts, and are not limited to vehicle speeds and stops for service vehicles.

It will be appreciated, therefore, that digital map data is more valuable when its information content is accurate and complete. Certain attribute specifications for road segments, such as posted speed limits, taxi stops, road geometries, point of interest (POI) information and the like may be included in association with particular road segments, junctions or other features of a digit map for all of these reasons.

Road positions and attributes are constantly changing. New roads are created, old roads are discontinued, construction activities create temporary blockages and unusual detours, speed limits change, bus and tax stop positions are moved, and the like. Accordingly, there is a continuing need to update digital maps with the latest and most current information available, including information about attributes such as speed limits, taxi and bus stops, road geometries and POI information. There is therefore a need for improved methods for updating digital maps so that the information contained in them will be current and of the maximum possible value to users of PNAV systems.

SUMMARY OF THE INVENTION

This invention relates to a method for updating certain attribute specifications for road segments in digital maps, such as posted speed limits, taxi stops, road geometries and POI information. The updating method is accomplished by extrapolating probe data from a subset of probe data which has been profiled to originate from trustworthy probes. The invention can be best understood in the context of a digital map having at least first and second road segments, each of the road segments having a common attribute with a respective attribute specification. The specification for the first road attribute is reliably known whereas the specification for the second road attribute is unknown or unreliable. Data from a plurality of probes that traverse both the first and second road segments are reported. The reported data includes attribute information. Each probe is matched to a specific road segment in the digital map for a given time while its attribute information is collected. A correspondence value is calculated between the known attribute specification of the first road segment and the reported attribute information for each probe that is matched to the first road segment. Once a correspondence threshold is defined for the specification of the attribute, a subset of trustworthy probes are identified from among the plurality of probes matched to the first road segment. The trustworthy probes are defined as those whose calculated correspondence value does not exceed the correspondence threshold. When the same trustworthy probes are matched to the second road segment, their reported attribute information is again collected. An attribute specification for the second road segment may then be extrapolated based on the collected attribute information from all of the trustworthy probes when matched to the second road segment. And finally, the digital map can be updated by setting the attribute specification for the second road segment in relation to the extrapolated attribute specification.

In a specific example, the method of this invention can be applied for updating the indicated speed limit for road segments in a digital map. In this context, a digital map is provided having at least first and second road segments, each road segment having an associated speed limit set by a regulating authority. The speed limit for the first road segment is reliably known, whereas the speed limit for the second road segment is not known or is unreliable. Data from a plurality of probes tracking across both of the first and second road segments is reported. The reported data includes (or enables the derivation of) velocity information. Each probe is matched to a specific road segment in the digital map for a given time while collecting its reported velocity information. A correspondence value is calculated between the known speed limit on the first road segment and the reported velocity information for each probe matched to the first road segment. A correspondence threshold is defined for the speed limit, for example ±5 km/h. From among the plurality of probes matched to the first road segment, a subset of trustworthy probes is identified. The trustworthy probes are those whose calculated correspondence value does not exceed the correspondence threshold. The reported velocity information from each trustworthy probe is collected when it is matched to the second road segment. A speed limit can then be inferred or predicted for the second road segment based on the collected velocity information from all of the trustworthy probes when matched to the second road segment. Then, the digital map may be updated by setting the indicated speed limit for the second road segment relative to the extrapolated speed limit.

Thus, according to this invention, the study of probe data reveals those particular probes which can be regarded as reliable, trustworthy or honest in relation to the particular road attribute. In the example of speed limits, the trustworthy probes are those which maintain a velocity which is acceptably close to the posted speed limit. In the case of heavy trucks/lorries, the trustworthy probes are those whose acceleration and/or speed profiles conform to known profiles. In the case of taxi stops, the trustworthy probes would be those whose traces stop at known taxi stops. Based on an assumption of reasonable constant behavior, the trustworthy probes are presumed to maintain their reliable behavior in areas where the particular road attribute (e.g., speed limit or taxi stop) is unknown or unreliable. Straightforward mathematical extrapolation allows an attribute to be predicted or set for the second road segment, which is then used to update a digital map thereby providing enhanced data content.

BRIEF DESCRIPTION OF THE DRAWINGS

These and other features and advantages of the present invention will become more readily appreciated when considered in connection with the following detailed description and appended drawings, wherein:

FIG. 2 is a simplified, bird's eye view of a portion of a road network in which a starting point and destination are indicated together with alternative travel routes suggested there between;

DETAILED DESCRIPTION OF THE PREFERRED EMBODIMENT

It is known, for example, to take probe data inputs from low-cost positioning systems and handheld devices and mobile phones with integrated GPS functionality for the purpose of incrementally creating and/or updating a digital map, as well as producing information such as traveling speed, altitude, stop positions, etc. The input to be processed usually consists of recorded GPS traces in the form of a standard ASCII stream, which is supported by almost all existing GPS devices. The output may be a road map in the form of a directed graph with nodes and edges annotated with travel time information and other relevant details. Travelers appropriately fitted with such devices to create probe traces may thus produce probe data while traversing road segments. For a discussion on one example of this technique, reference is made to "Incremental Map Generaltion with GPS Traces," Brüntrup, R., Edelkamp, S., Jabbar, S., Scholz, B., Proc. 8th Int. IEEE Conf. on Intelligent Transportation Systems, Vienna, Austria, 2005, Pages 413-418.

Figure 3A:
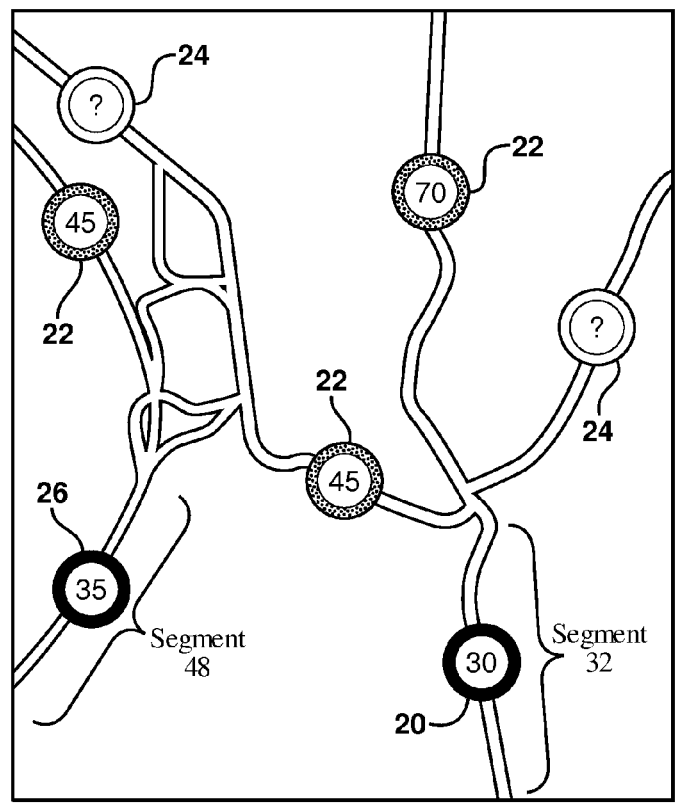
FIG. 3A is a simplified, fragmentary view of a digital map containing a plurality of road segments, two of which have known-verified speed data and the other road segments having either unverified or unknown speed data attributes.
Figure 3B:
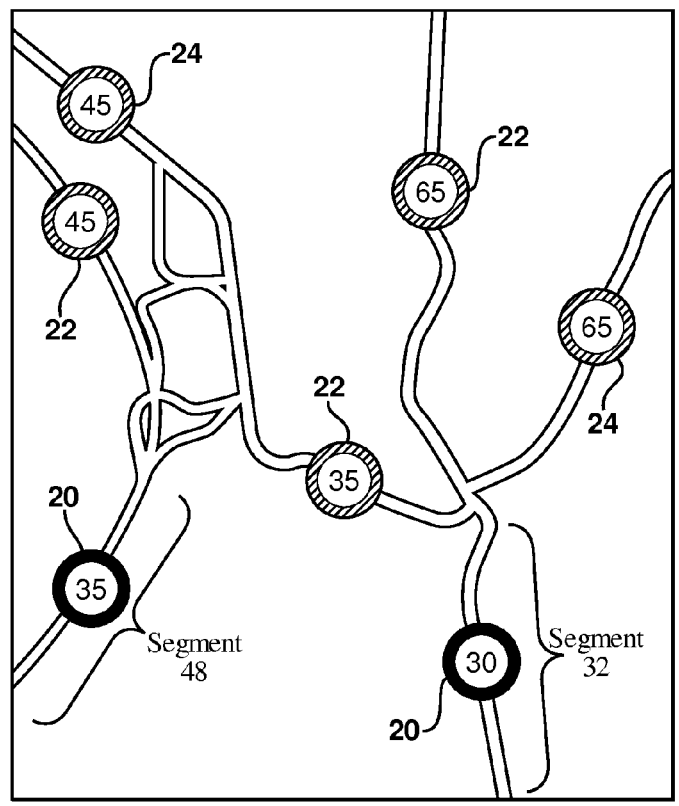
FIG. 3B is a view as in FIG. 3A but showing the same road segments wherein the previously unknown and unverified speed data attributes have been updated according to the methods of this invention.

Referring to the Figures, wherein like numerals indicate like or corresponding parts throughout the several views, an exemplary digital map having multiple road segments is generally shown at 18 in FIGS. 3A and 3B. In FIG. 3A, the digital map 18 is presented with outdated or incomplete information, whereas the same digital map 18 in FIG. 3B is shown having been updated so as to include additional speed data attributes. More specifically, the digital map 18 includes a plurality of road segments which may be defined generally as a portion of a roadway extending between two nodes, two junctions, or a node and a junction. Two road segments are identified in these figures as segment 32 and segment 48. These segments 32, 48 are intended to correspond with data presented in connection with FIGS. 8A/B and 9A/B, respectively. Each road segment in this example includes an associated speed attribute which corresponds with the speed limit established for that particular road segment by the regulating authority. Throughout the following description of this invention, speed limits will be used as a convenient example of a particular attribute associated with the road segments, but is by no means the only attribute which can be updated according to the methods of this invention. Indeed, other road attributes such as taxi or bus stops, road geometries, point of interest (POI) information, altitude, and the like may be updated using the methods taught herein.

Figure 1:
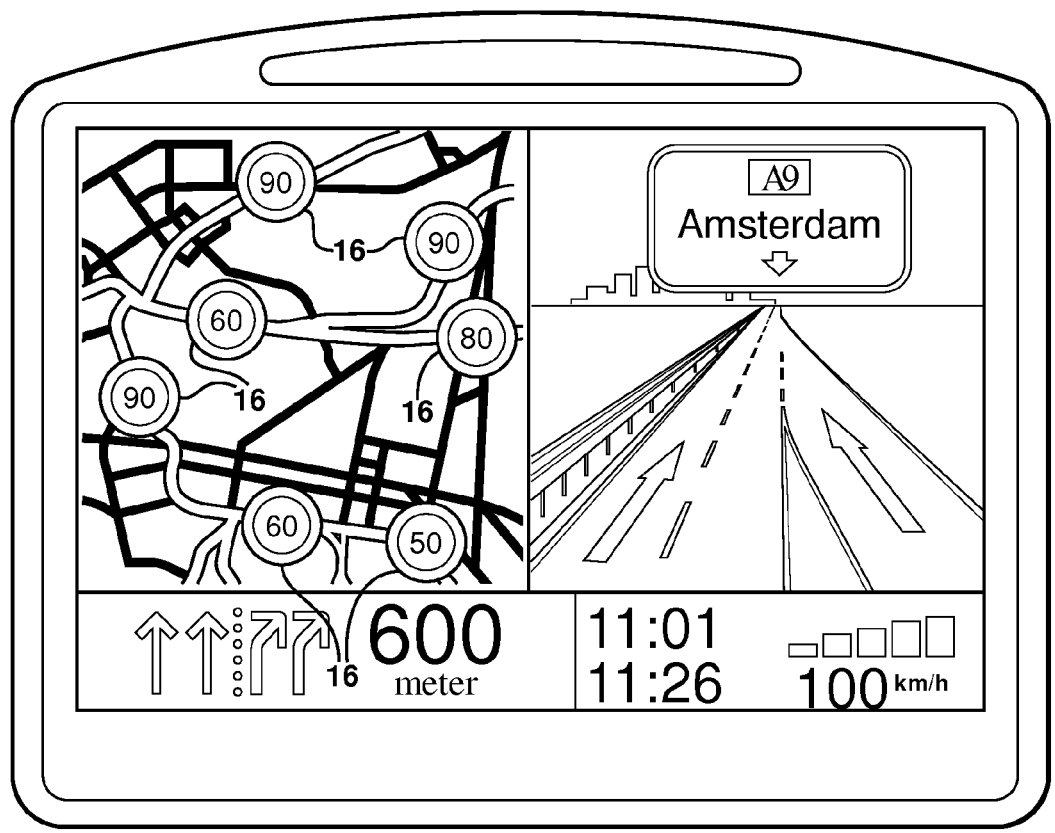
FIG. 1 is an exemplary view of a portable navigation system according to one embodiment of the invention including a display screen for presenting map data information to a vehicle driver and for optimally functioning as a probe.
Figure 2:
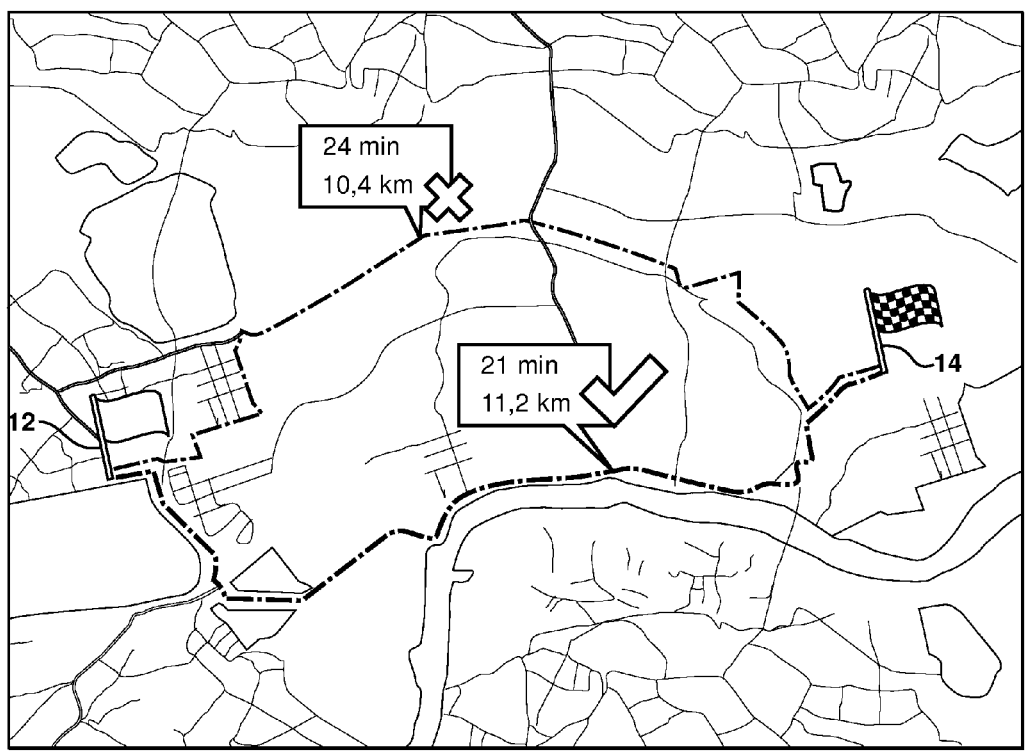

Returning to FIG. 3A, segments 32 and 48 may be characterized as road segments whose speed data attributes are reliably known. These are shown as 30 mph for segment 32 and 35 mph for segment 48. Indicators 20 appear on the display of the digital map 18 to provide information about the known/verified speed limits existing along the respective segments 32 and 48. In this example, however, the speed data attributes along other road segments in the displayed network are either unknown or unverified. For example, indicators 22 represent speed limit identification for their respective road segments which the digital map provider has been unable to verify as ground truth. Thus, the indicated speed limits may be inaccurate and a driver or navigator relying upon them could be misled. Similarly, indicators 24 represent those road segments which the map provider has no information about the speed limit attribute. Thus, if a map as shown in FIG. 3A were displayed on a PNAV device like that of FIG. 1, a navigator would be unable to rely upon all of the information being displayed.

It is to be understood that the concepts and principles of this invention are applicable in all kinds of navigation systems, including but not limited to handheld devices, PDAs, and mobile phones with navigation software as well as in-car navigation systems built in a vehicle. The principles of this invention can be implemented in any type of standard navigation system available on the market. The description of one embodiment of this invention is presented in terms of one possible in-car navigation system, however this is not to exclude any other type of implementation, for instance, a handheld device.

It is also understood that many PNAV devices in other navigation systems like those described above may function as a probe in addition to that of a GPS receiver. Functioning in this capacity, position information with a time stamp, as well as other attribute data, is recorded every four seconds (for example) as the probe tracks across various road segments in the digital map 18. Over time, such probe data can be collected and aggregated resulting in hundreds of billions of anonymous measurements received from millions of devices that reflect actual driving patterns within the road network. A growing number of data points collected from this floating-car data enterprise, over a long period of time, is useful for many purposes. In the context of this invention, this reported probe data from a plurality of probes can be analyzed to find a subset whose behavior can be profiled and used as the basis for extrapolating missing attributes such as speed limits, taxi stops, or other useful attributes.

Figure 4:
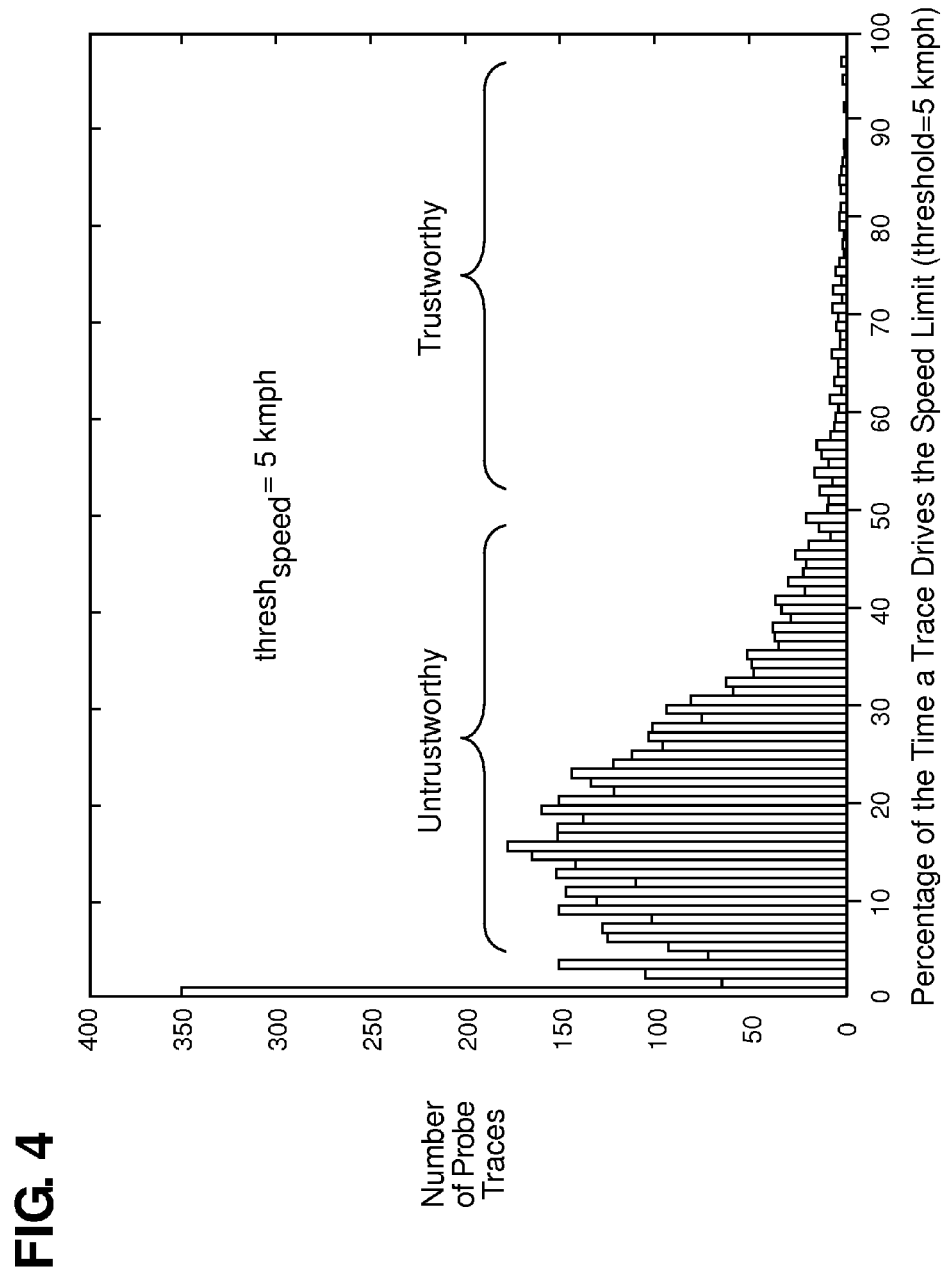
FIG. 4 depicts a sample data report from a plurality of probes which have been matched to a specific road segment whose speed data attribute is known, a subset of which can be defined as trustworthy probes based on a particular set correspondence value.

More specifically, FIG. 4 depicts a graph in which reported speed attribute data has been collected from a plurality of probes tracking across a first road segment, i.e., a road segment in which its speed limit is known conclusively. Applying a simple algorithm, e.g., "Driving speed limit": $|v_{probe} - v_{official}| < \text{thresh}_{speed}$ it is possible to calculate the percentage of time a particular probe drives the speed limit within a given tolerance, here shown to be ±5 km/h. The actual reported or derived velocity of a probe relative to the known speed limit can be characterized as a correspondence value. Thus, if the speed limit is 45 mph and the average reported speed of a particular probe along the road segment is 52 mph, the correspondence value may be calculated at 7 mph, or 7 miles per hour faster than the posted speed limit. In the example if FIG. 4, the tolerance of ±5 kmph presents a correspondence threshold. Probe traces whose correspondence value exceeds the correspondence threshold for a given period of time are deemed less trustworthy than those which operate within the tolerance speed for a greater period of time.

In the alternative example of taxi stops, a probe whose trace stops at every taxi stop but one will be considered trustworthy as to the taxi stop attribute if the threshold is greater than or equal to 1.

Figure 5:
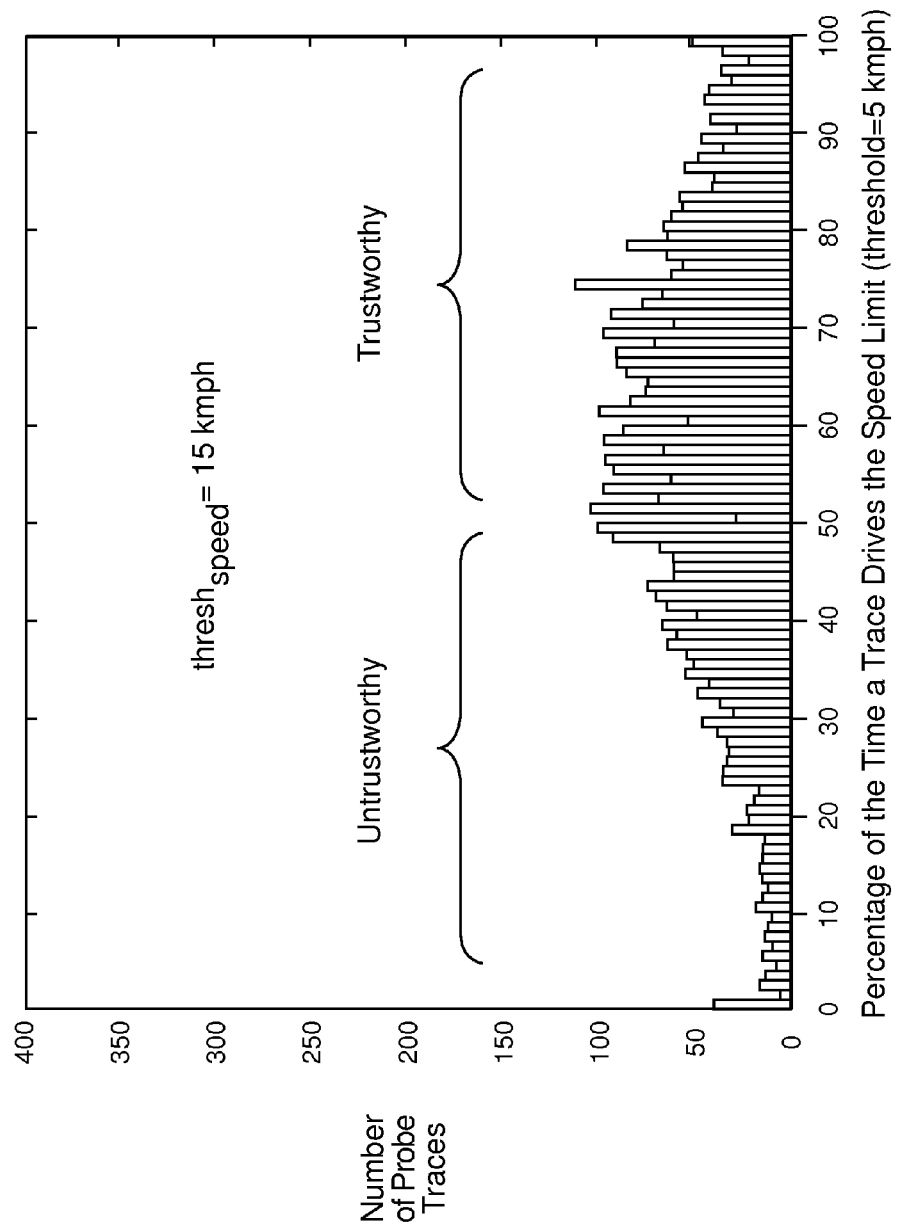
FIG. 5 is a view as in FIG. 4 showing the same probe data but with a different subset of probes being identified as trustworthy due to a change in the selected correspondence value.
Figure 6:
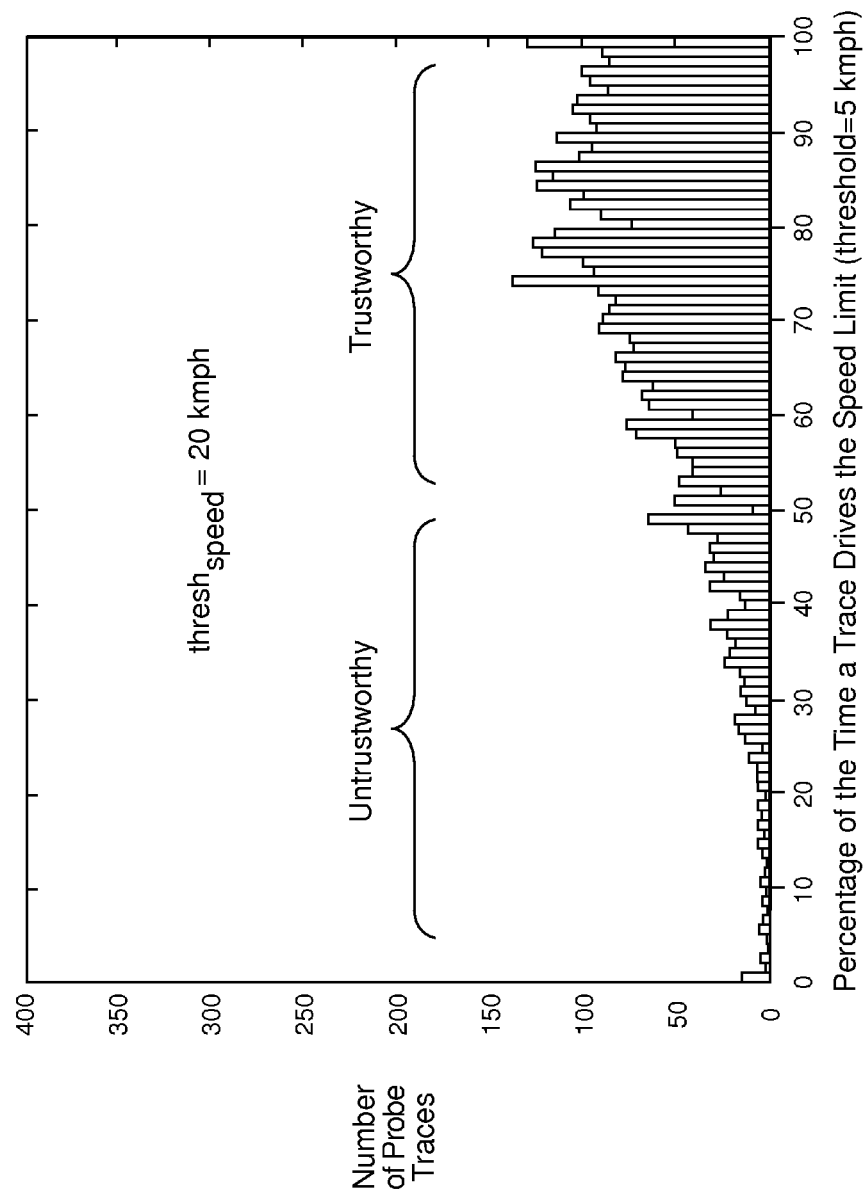
FIG. 6 is a view as in FIG. 4 wherein yet a still further change in correspondence value has resulted in a different distribution of probes being identified as trustworthy.

FIG. 5 represents the same data depicted in FIG. 4, but shows how the subset of trustworthy probes can be increased by enlarging the correspondence value. In this case, the tolerance has been increased to 15 kmph, which shows a substantial shift in the probes which operate within the correspondence threshold for more than 50% of the time. FIG. 6 is a still further view as in FIG. 5, but showing an increase in the correspondence threshold to 20 kmph and the resulting rightward shift of probes which can be classified as trustworthy. Thus, one component in the step of identifying a subset of trustworthy probes from among the plurality of probe traces may include establishing a duration factor of 1.0 or less over which the trustworthy probe remains within the correspondence threshold. An exemplary algorithm may take the following form: "Large part": % of time "driving speed limit">$\text{thresh}_{time}$. Thus, a duration factor of 1.0 would correspond to 100% in FIGS. 4-6, or a probe whose reported velocity information does not exceed the correspondence threshold the entire time during which that particular probe is matched to the first road segment. These figures suggest a duration factor of 0.5 approximately, or about 50% of the time for which a probe remains within the correspondence threshold in order to be classified as trustworthy.

Figure 7:
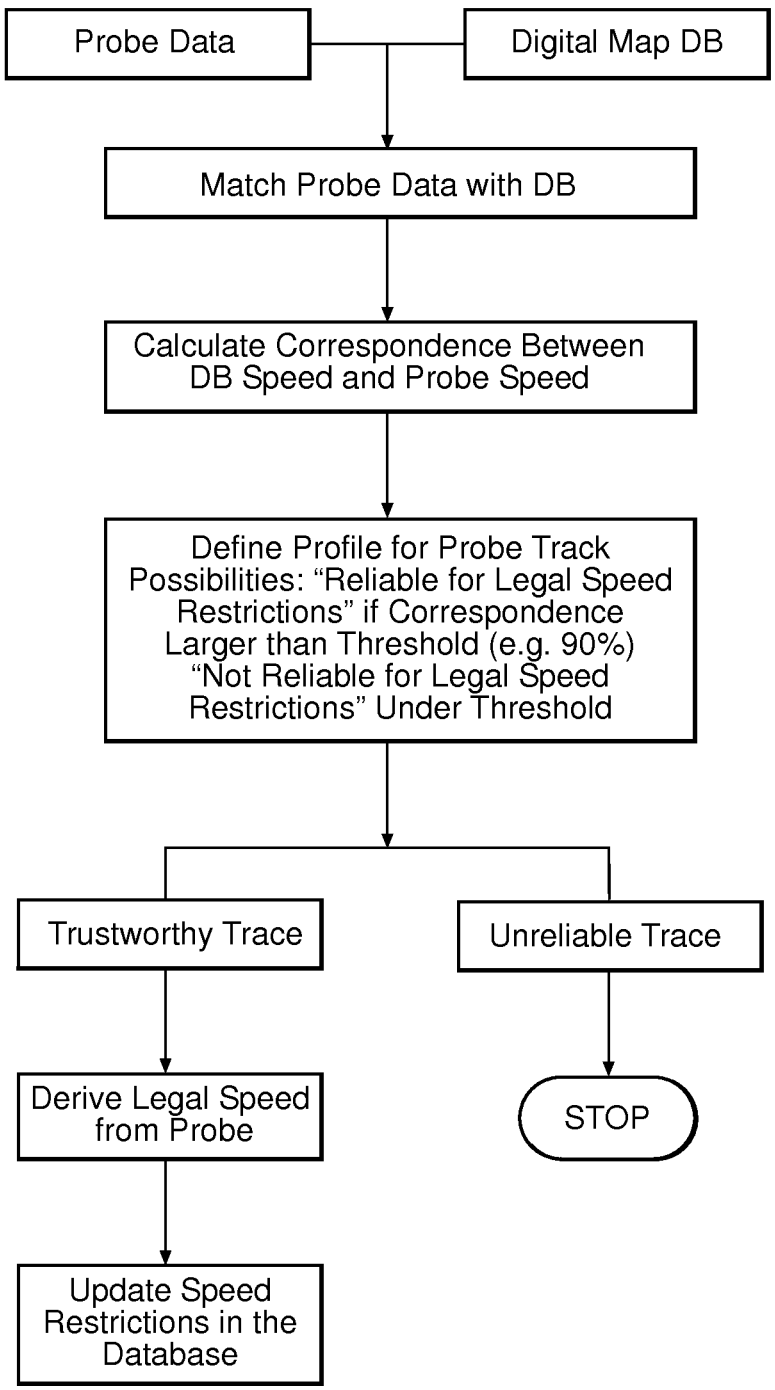
FIG. 7 is a simplified flow chart illustrating functional steps in connection with the methods of this invention.

FIG. 7 shows a simplified flow diagram corresponding to this invention. Steps described in the preceding paragraphs follow the flow chart in FIG. 7 to the point at which reliable traces, i.e., trustworthy probe data, can be separated from unreliable or untrustworthy trace information. The unreliable or untrustworthy probe data follows to the "stop" function block where it is disregarded for purposes of updating the digital map with the particular attribute specifications of interest. The subset of trustworthy or reliable probes data, however, can then be used to derive legal speed limits, taxi stops, or other pertinent attribute specifications for the purpose of updating the digital map data base.

Figure 8B:
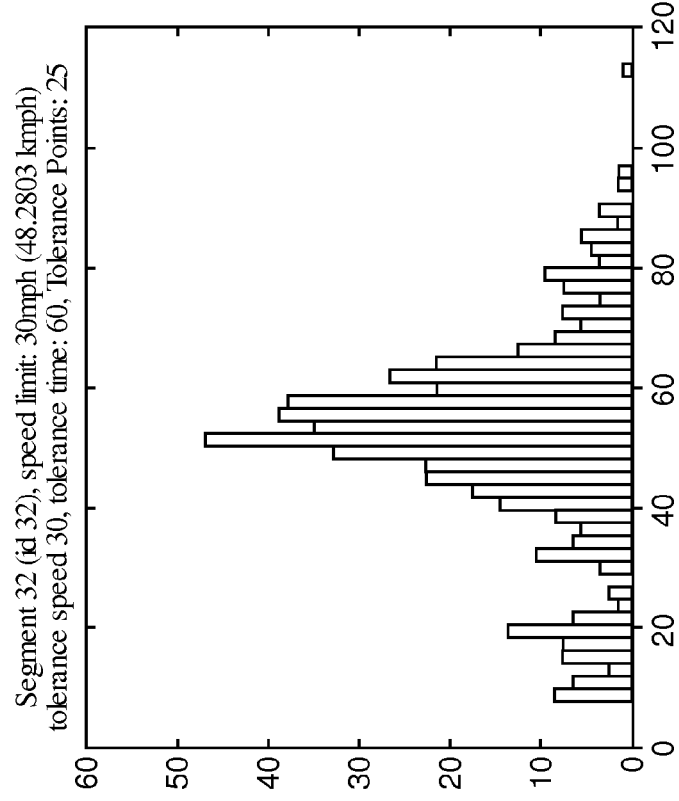
FIG. 8B is a view as in FIG. 8A but showing the same speed distribution for the same segment (segment 32) represented by a subset of trustworthy probes.
Figure 8A:
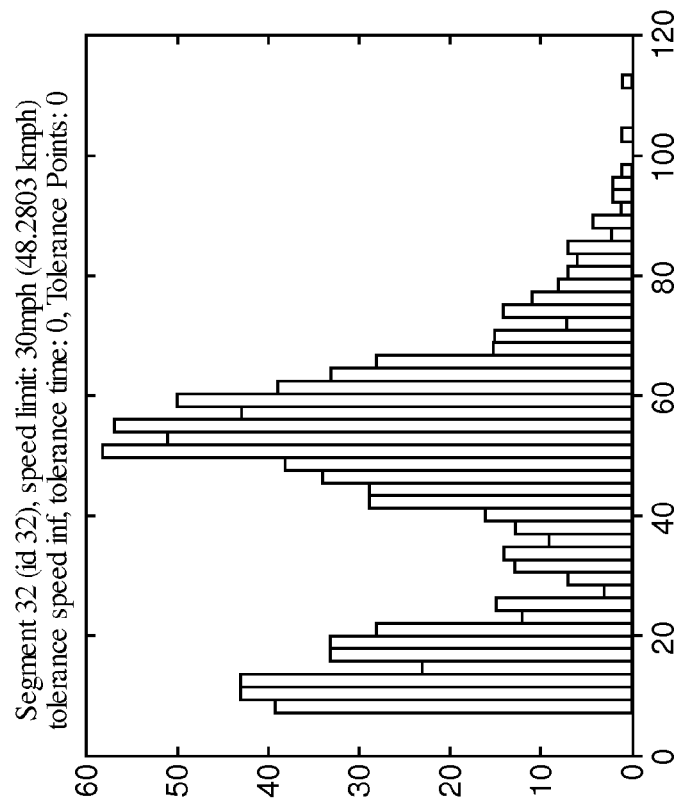
FIG. 8A is a speed distribution for a particular road segment (segment 32 in this example) showing the plotting of all reported data from the plurality of probes traversing this particular road segment.
Figures 9A, 9B:
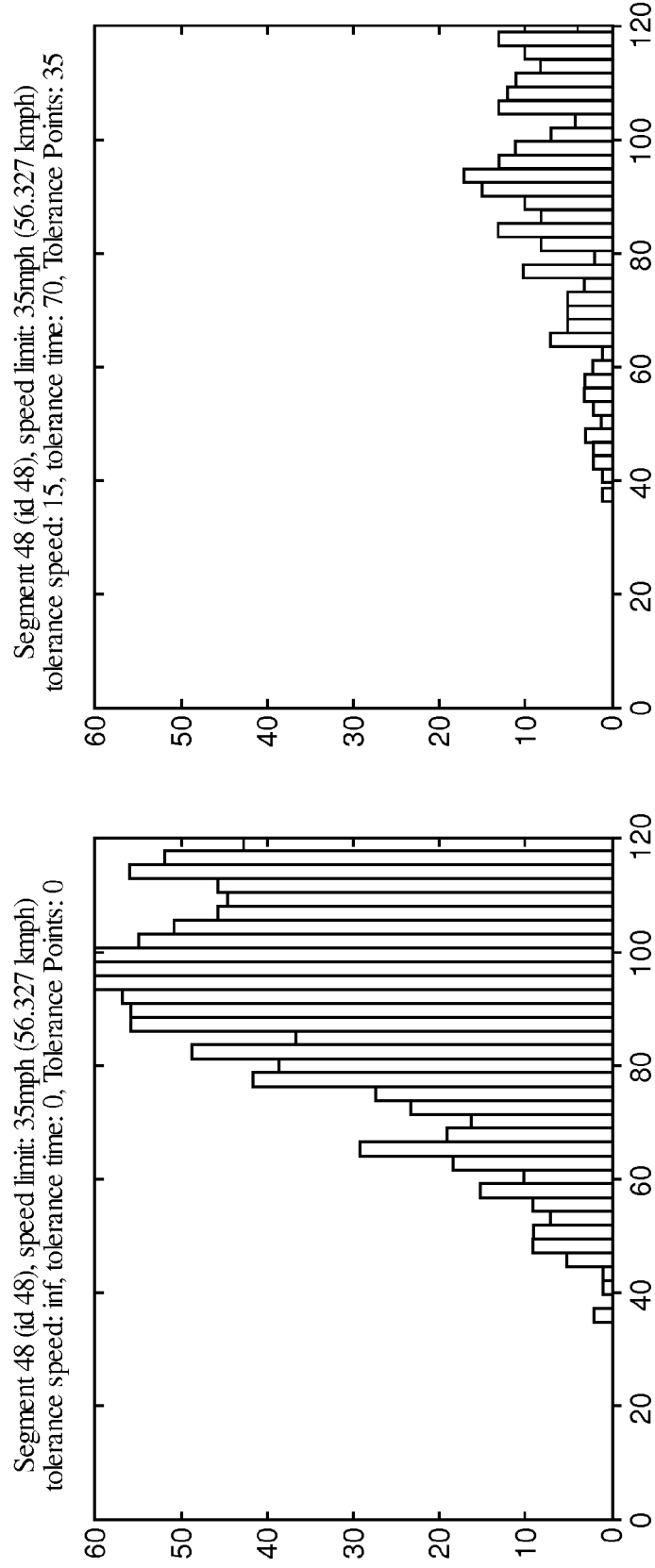
FIG. 9A is yet another example of a speed distribution chart like that in FIG. 8A but for a different road segment (segment 48) in which all reported data from a plurality of probes is plotted.
FIG. 9B represents the same speed distribution for the same road segment as in FIG. 9A, but containing only data reported by the subset of trustworthy probes.

FIG. 8A shows a collection of reported data from a plurality of probes traversing road segment 32 in FIG. 3A. In this example, it is reliably known that the posted speed limit for segment 32 is 30 mph. Data reflects an infinite tolerance speed. FIG. 8B portrays the same probe data but with different filtering criteria. Applying the concepts described above, the known speed limit of 30 mph in which a correspondence threshold of 30 mph is set, together with a duration factor (tolerance time) of 0.60. A plot of trustworthy probe data results in the histogram as shown. FIGS. 9A and 9B represent similar applications under this protocol as applied to segment 48 in which the reliably known speed limit is 35 mph.

Figure 10:
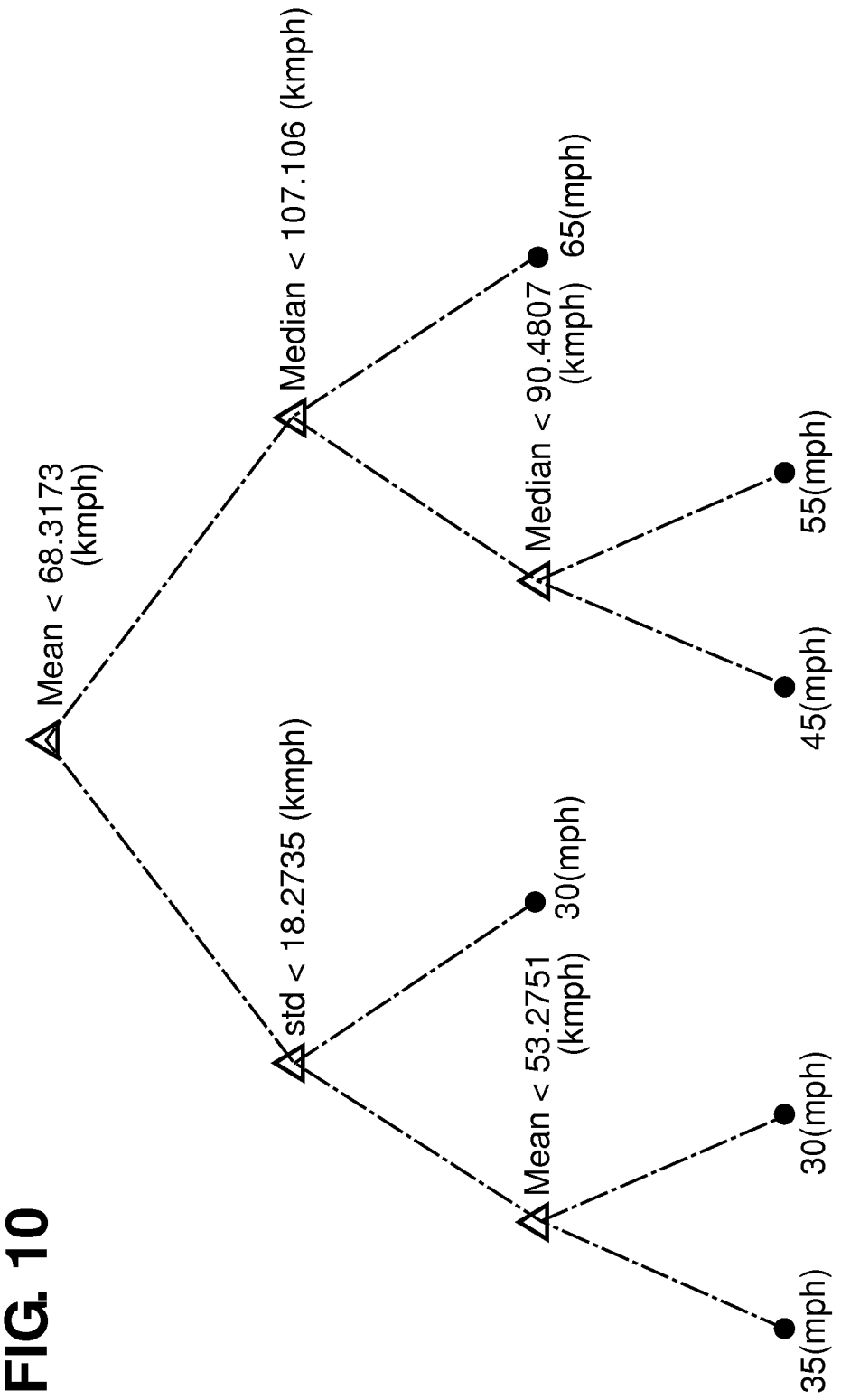
FIG. 10 is a sample classification tree constructed to determine the speed limits for road segments having unknown or unreliable speed data attributes based on features calculated from the speed distribution of probe data.

With the derived subset of trustworthy probes, it is possible to collect information reported by those same trustworthy probes when their traces are matched to the second road segment, or another road segment whose speed profile data is not known or is unreliable. By assuming a reasonable constant behavior of the trustworthy probes, it is possible to extrapolate missing speed limits or other attribute data from the second road segment. In other words, once a selection of the trustworthy probes is made in relation to speed behavior, a speed distribution can be built for every other segment in the digital map 18 over which those trustworthy probes travel. From that distribution, a number of features can be calculated such as median speed, average speed, deviation, etc. Thus, every segment of roadway in the digital map 18 can be represented by a set of numbers (one for every feature), and those numbers used to determine a predicted speed limit on that segment. For example, a classification tree like that shown in FIG. 10 can be constructed to determine the speed limits for other segments, only based on their features calculated from the speed distribution of probe data. In this example, road segments are labeled with their official speed limits as calculated based on the calculated features such as median, mean and standard deviation. For example, a road segment having the features median=60, mean=20, std=10 is labeled as having a speed limit of 30 mph (it should be noted that probe speeds are shown in FIG. 10 in kmph, whereas speed limits are illustrated in mph).

By way of further example, tests have been conducted on a sample digital map 18 containing 155 road segments based on 322,000 discreet pieces of reported data from a plurality of probes. From the collected data, which included a subset of trustworthy probes being identified and then tracked as they traveled along road segments having unknown or unreliable speed limit attributes, the following results were revealed for six different road segments (A-F).

F is 25 mph, a 28.6% chance that it is 30 mph, etc. Thus, using such techniques, it is possible to label road segments with a speed limit based on collected probe data with exceptionally high confidence levels, e.g., on the order of 60% to 80%. Thus, the concepts of this invention may be regarded as a technique for profiling probe data with the intention to create geometry, attributes, POI information or other data such as speed limit features. Such collected and profiled probe data can be used to create geometry and fill in missing data for the benefit of updating digital map information. Profiling of the probe trace data is based on the observation of behavior in locations where the particular attribute of interest, e.g., speed limit data, are presumed correct. Based on assumptions of a reasonable constant behavior of the driver, missing attribute data can be extrapolated or corrected, or at least validated in other portions of the digital map.

A foreseeable exception to this general approach may arise if it is presumed that some temporal, dynamic factor has influenced the majority of drivers to drive atypically. In such circumstances it may be advisable to categorically identify all of the probe traces traversing the particular road segment as untrustworthy. For example, in the case of adverse weather conditions occurring in segments where there is a high confidence of the posted speed limit, a statistical representation of the probe measurements is expected to fall remarkably below the posted speed limit for that segment and particular time span. It may be wise to assume that adverse weather conditions (or possibly some other factor like a traffic accident, road debris, etc.) have influenced cautious driving. Under these conditions, it may be prudent to identify all of the traces as untrustworthy, and not use any of them to extrapolate speed limits in low confidence areas. This assumption can be considered reasonable on the basis that any driver who is traveling the actual speed limit during adverse weather, when the majority of traffic is traveling much slower, will not reliably predict the speed limit in other road segments.

By collecting a number of probe traces from different anonymous users, a particular profile can be attached to the observed behavior. In the example of speed limit attributes, the particular behavior being observed is probe trace velocity relative to posted speed limits and the duration of conformity. In the case of service vehicle stops, the particular behavior being observed is probe trace stop positions relative to known service vehicle stop locations. Any other attribute, i.e., some attribute other than speed or stop location, can be extrapolated

| | Speed Profile | | | | | | |
|---|---|---|---|---|---|---|---|
| Segment | 25 | 30 | 35 | 45 | 55 | 65 | 70 | Conclusions: |
| A | 2.7778 | 22.2222 | 72.2222 | 2.7778 | 0.0000 | 0.0000 | 0.0000 | 72.2% chance that Segment A is posted 35 MPH |
| B | 16.6667 | 58.3333 | 16.6667 | 8.3333 | 0.0000 | 0.0000 | 0.0000 | 58.3% chance that Segment B is posted 30 MPH |
| C | 0.0000 | 0.0000 | 0.0000 | 8.0000 | 0.0000 | 84.0000 | 8.0000 | 84.0% chance that Segment C is posted 65 MPH |
| D | 0.0000 | 31.8182 | 0.0000 | 68.1818 | 0.0000 | 0.0000 | 0.0000 | 68.2% chance that Segment D is posted 45 MPH |
| E | 0.0000 | 2.2222 | 4.4444 | 24.4444 | 66.6667 | 2.2222 | 0.0000 | 66.7% chance that Segment E is posted 55 MPH |
| F | 6.1224 | 28.5714 | 61.2245 | 4.0816 | 0.0000 | 0.0000 | 0.0000 | 61.2% chance that Segment F is posted 35 MPH |

In the preceding example, each row (A-F) represents a particular road segment or a particular end node of a road segment, and each column represents a certain class of speed (25, 30, 35, 45, 55, 65, 70). The label of a row corresponds with the label of the column with the highest number. For example, considering segment F, a conclusion can be drawn that its extrapolated speed limit is 35 mph because the results indicate there is a 61.2% chance that the road speed class is 35 mph. There is a 6.1% chance that the speed class for segment by similarly observing trace behavior as it concerns that attribute. Extrapolated attribute specifications can be used to improve or correct data in digital maps, with all road classes and using historical probe data when available. Furthermore, from time-to-time unpredictable dynamic conditions may arise that provoke atypical driving behavior. If a statistical representation of the probe measurements indicates atypical behavior in areas where there is high confidence of the particular attribute, e.g., average vehicle speeds well below the posted limits, then all probe measurements may be categorically rejected as unreliable predictors so as to maintain a data population with the highest possible confidence levels.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A method for updating certain attribute specifications for road segments in digital maps, by extrapolating probe data from a profiled subset of trustworthy probe traces, said method comprising the steps of:

accessing, by a processing device, a digital map having at least first and second road segments stored on a storage medium, each of the road segments having a common attribute with a respective attribute specification, the specification for the first road segment attribute being known and the specification for the second road segment attribute being unknown or unreliable;

obtaining, by the processing device, data reported from a plurality of probes tracking across both of the first and second road segments, the reported data including attribute information;

matching, by the processing device, each probe trace to a specific road segment in the digital map for a given time while collecting its reported attribute information;

calculating, by the processing device, a correspondence value between the known attribute specification of the first road segment and the reported attribute information for each probe trace matched to the first road segment;

defining, by the processing device, a correspondence threshold for the known attribute specification;

identifying, by the processing device, from among the plurality of probe traces matched to the first road segment a subset of trustworthy probe traces whose calculated correspondence value does not exceed the correspondence threshold;

collecting, by the processing device, the reported attribute information from each trustworthy probe trace when matched to the second road segment;

extrapolating, by the processing device, an attribute specification for the second road segment based on the collected attribute information from all of the trustworthy probe traces when matched to the second road segment; and updating, by the processing device, the stored digital map by setting the attribute specification for the second road segment in relation to the extrapolated attribute specification.

2. The method of claim 1 wherein said step of defining a correspondence threshold for the attribute specification includes setting a variance range whose mean and median is generally equal to the official specification.

3. The method of claim 1 wherein said step of defining a correspondence threshold for the attribute specification includes establishing a duration factor of 1.0 or less over which the trustworthy probe trace must remain within the correspondence threshold.

4. The method according to claim 1 wherein said step of extrapolating an attribute specification for the second road segment includes developing a classification tree.

5. The method according to claim 4 wherein said step of developing a classification tree includes identifying the median, average and deviation values for the collected attribute information from each trustworthy probe trace when matched to the second road segment.

6. The method according to claim 1 wherein the attribute is a speed limit and the specification is established by a regulating authority.

7. The method according to claim 1 wherein said reported data includes data obtained by transporting each probe in a motor vehicle over the first and second road segments.

8. The method of claim 1 wherein said reported data includes data obtained by transporting each probe in a bicycle over the first and second road segments.

9. The method according to claim 1 further including the step of categorically rejecting, by the processing device, as unreliable all probe traces if a statistical representation of probe measurements indicates atypical behavior in the first road segment.

10. A method for updating the indicated speed limit for road segments in a digital map by extrapolating probe data from a profiled subset of trustworthy probe traces, said method comprising the steps of:

accessing, by a processing device, a digital map having at least first and second road segments stored on a storage medium, each of the road segments having an associated speed limit set by a regulating authority, the speed limit for the first road segment being known and the speed limit for the second road segment being unknown or unreliable;

obtaining, by the processing device, reported data from a plurality of probe traces tracking across both of the first and second road segments, the reported data including velocity information or enabling the derivation of velocity information;

matching, by the processing device, each probe trace to a specific road segment in the digital map for a given time while collecting its reported velocity information;

calculating, by the processing device, a correspondence value between the known speed limit of the first road segment and the reported velocity information for each probe trace matched to the first road segment;

defining, by the processing device, a correspondence threshold for the known speed limit;

identifying, by the processing device, from among the plurality of probe traces matched to the first road segment a subset of trustworthy probe traces whose calculated correspondence value does not exceed the correspondence threshold;

collecting, by the processing device, the reported velocity information from each trustworthy probe trace when matched to the second road segment;

extrapolating, by the processing device, a speed limit for the second road segment based on the collected velocity information from all of the trustworthy probe traces when matched to the second road segment; and updating, by the processing device, the stored digital map by setting the indicated speed limit for the second road segment in relation to the extrapolated speed limit.

11. The method of claim 10 wherein said step of defining a correspondence threshold for the speed limit includes setting a variance range whose mean and median is the posted speed limit.

12. The method of claim 10 wherein said step of defining a correspondence threshold for the speed limit includes establishing a duration factor of 1.0 or less over which the trustworthy probe trace must remain within the correspondence threshold.

13. The method of claim 10 wherein said step of extrapolating a speed limit for the second road segment includes developing a classification tree.

14. The method of claim 13 wherein said step of developing a classification tree includes identifying the median, average and deviation values for the collected velocity information from the trustworthy probes when matched to the second road segment.

15. The method of claim 10 further including the step of categorically rejecting, by the processing device, as unreliable all probe traces if the average velocity in the first road segment is substantially below the known speed limit.

16. A method for updating service stop indicators for road segments in a digital map by extrapolating probe data from a profiled subset of trustworthy probe traces, said method comprising the steps of:

accessing, by a processing device, a digital map having at least first and second road segments stored on a storage medium, each of the road segments having at least one service stop set by a regulating authority, the service stop location for the first road segment being known and the service stop location for the second road segment being unknown or unreliable;

obtaining, by the processing device, reported data from a plurality of probe traces tracking across both of the first and second road segments, the reported data including position and time stamp information sufficient to derive stop position behavior;

matching, by the processing device, each probe trace to a specific road segment in the digital map for a given time while collecting its reported stop position behavior;

calculating, by the processing device, a correspondence value between the reported stop position behavior for each probe trace matched to the first road segment and the known service stop locations along the first road segment;

defining, by the processing device, a correspondence threshold for the known service stop locations;

identifying, by the processing device, from among the plurality of probe traces matched to the first road segment a subset of trustworthy probe traces whose calculated correspondence value does not exceed the correspondence threshold;

collecting, by the processing device, the reported stop position behavior from each trustworthy probe trace when matched to the second road segment;

extrapolating, by the processing device, a service stop for the second road segment based on the collected stop position behavior from all of the trustworthy probe traces when matched to the second road segment; and updating, by the processing device, the stored digital map by setting the indicated service stop locations for the second road segment in relation to the extrapolated service stop behavior.

* * * * *